United States Patent [19]
Zienkiewicz et al.

[11] Patent Number: 5,613,395
[45] Date of Patent: Mar. 25, 1997

[54] COLDWORKING TOOL AUTOMATION

[75] Inventors: John W. Zienkiewicz, North Tonawanda; Bradley M. Roberts, Williamsville, both of N.Y.

[73] Assignee: Gemcor Engineering Corp., Buffalo, N.Y.

[21] Appl. No.: 386,013

[22] Filed: Feb. 9, 1995

[51] Int. Cl.$^6$ .................................................. B21D 39/08
[52] U.S. Cl. .............................. 72/370; 72/391.2; 72/463
[58] Field of Search ................................... 72/370, 391.2, 72/393, 463

[56] References Cited

U.S. PATENT DOCUMENTS

| | | | |
|---|---|---|---|
| 4,640,114 | 2/1987 | Kuless | 72/370 |
| 4,869,091 | 9/1989 | Shemeta | 72/393 |
| 5,305,627 | 4/1994 | Quincey et al. | 72/391.2 |

*Primary Examiner*—Lowell A. Larson
*Attorney, Agent, or Firm*—Hodgson, Russ, Andrews, Woods & Goodyear LLP

[57] ABSTRACT

In an automatic apparatus including a frame defining a work axis relative to a workpiece held in position relative to the frame, a transfer assembly on the frame and operatively associated with a machine tool for moving the machine tool into and out of positional alignment with the work axis, and a coldworking tool carried by the transfer assembly and defining a coldworking tool axis that is spaced from the axis of the tool. The coldworking tool is movable into an operative position with the axis thereof being coincident with the work axis when the transfer assembly moves the machine tool out of positional alignment with the work axis whereupon the coldworking tool is then axially movable along the work axis and into and out of a hole provided in the workpiece for coldworking the same. A fluid delivery assembly is on the frame and connected to a source of fluid used by the coldworking tool. The coldworking tool has a fluid port for receiving fluid comprising lubricant and coolant when the coldworking tool is out of alignment with the work axis and as part of the workpiece operation cycle of the apparatus. There is also provided a coldworking tool assembly having a transducer for monitoring the distance travelled by the mandrel thereof so that the amount of mandrel travel can be controlled to accommodate variations in machine tooling which contacts the workpiece and therefore avoid the mandrel tip impacting the tooling.

36 Claims, 9 Drawing Sheets

COLDWORKING TOOL AUTOMATION

TECHNICAL FIELD

The present invention relates to the art of automatic fastening machines, and more particularly to a new and improved machine and method provided with an automated coldworking tool, means for lubricating the same, and a new and improved coldworking tool for use with such automatic fastening machines.

BACKGROUND OF THE INVENTION

Automatic fastening machines are well known and have particular application in the fabricating and assembly of aircraft structures. Such a fastening machine utilizes a numerically controlled transfer head that selectively positions various tools mounted on the machine for sequential operation on a workpiece. In the case of joining two metal workpieces to form a wing panel, the transfer head positions a motorized drill over the workpieces and a hole is drilled therethrough. The transfer head then removes the motorized drill and engages a rivet tool with a large hydraulically-operated cylinder mounted on the fastening machine.

In operation, the rivet tool first picks up a fastener such as a rivet and the hydraulic cylinder actuates to insert the rivet into the hole with both ends of the rivet protruding beyond the workpiece. Heads are formed on the rivet ends to thereby join the workpieces by cooperative interaction between an anvil attached to the hydraulic cylinder and a backup bucking ram, whereupon the transfer head disengages the rivet tool. If desired, the transfer head positions a motorized shave tool over that rivet head formed on the outside surface of the workpiece to mill the upper head of the rivet flush with that surface after rivet upset. In addition, the shave tool can be used to mill the inside surface of the drilled hole to provide a smooth finish prior to rivet insertion.

In some fastening applications, the drilled hole is expanded to a predetermined size before fastener insertion by coldworking the hole. This is done to increase the material strength of the workpiece around the hole to thereby resist localized stress concentrations. Coldworking is the process of plastically deforming metal at a temperature below its annealing point in order to increase the hardness and tensile strength of the metal.

The coldworking assembly consists of a collapsible or split mandrel and a pusher assembly attached to a rod that is axially movable through an internal passage in the mandrel. The mandrel is provided with plurality of longitudinal slots spaced at uniform intervals around the circumference of the mandrel and extending therethrough to provide a plurality of collapsible fingers. The mandrel is hydraulically inserted into the hole and the collapsible fingers expand when the rod is moved through the mandrel passage. An internal locking assembly maintains this expanded mandrel position so that when the mandrel is hydraulically withdrawn, the hole is expanded or coldworked to the predetermined size. An internal release system unlocks the rod for retraction out of the mandrel to collapse the mandrel for a subsequent operation. The coldworking tool is then removed from the vicinity of the hole to enable a motorized reaming and/or countersinking operation to be performed before the fastener is inserted into the hole and upset.

While the split mandrel coldworking tool works well for its intended purpose, there is a problem with wear on the rod and mandrel as these members move with respect to each other during mandrel expansion after insertion into the hole, and again when the rod is removed through the mandrel passage after completing of the coldworking operation. Such wear creates a need for periodic lubrication of the coldworking tool.

In addition, coldworking tool assemblies heretofore available provide a fixed amount of mandrel travel when inserted in the workpiece and therefore the mandrel typically extends a fixed distance beyond the opposite side of the workpiece. Variations in cavity depth of tooling contacting the opposite side of the workpiece can present a problem of the mandrel tip impacting the tooling. Such tooling variation creates a need for controlling the amount of mandrel travel.

SUMMARY OF THE INVENTION

It is, therefore, a primary object of this invention to provide a new and improved automatic fastening machine provided with automated coldworking tool means.

it is a more particular object of the present invention to provide such an automatic fastening machine wherein coldworking of the workpiece hole which receives the fastener is provided as part of the fastener insertion cycle of the automatic machine operation.

It is further object of this invention to provide such an automatic fastening machine having capability for automatically lubricating the coldworking tool means.

It is a more particular object of this invention to provide such an automatic fastening machine wherein lubrication of the coldworking tool means is provided as part of the fastener insertion cycle of the automatic machine operation.

It is further object of this invention to provide a new and improved coldworking tool for use with an automatic fastening machine.

It is a more particular object of this invention to provide such a coldworking tool having provision to accommodate size variations in the tooling which contacts the workpiece in such automatic fastening machines.

The present invention provides in an automatic apparatus comprising a frame defining a work axis with respect to a workpiece held in position relative to the frame, a tool means having a first stationary component carried by the frame and a second component that is movable towards and away from the workpiece along a tool axis to operate on the workpiece, a transfer means mounted on the frame and operatively associated with the tool means for moving the tool means into and out of positional alignment with the work axis, wherein the tool axis is coincident with the work axis when the tool means is in positional alignment, and a coldworking tool means carried by the transfer means and defining a coldworking tool axis that is spaced from the tool axis. The coldworking tool means is movable into an operative position with the axis thereof being coincident with the work axis when the transfer means moves the tool means out of positional alignment with the work axis whereupon the coldworking tool means is then axially movable along the work axis and into and out of a hole provided in the workpiece for coldworking the same. A control means is operatively associated with the transfer means for selectively directing movement of the respective tool means and the coldworking tool means into and out of positional alignment with the work axis, and the control means further controls the axial movement of the coldworking tool means along the work axis to move the coldworking tool means into and out of the hole in the workpiece. A fluid delivery means is carried by the frame and adapted for connection to a source of fluid used by the coldworking tool means. The coldworking tool means has a fluid port means for receiving fluid for use by the coldworking tool means, the fluid port means being positioned on the coldworking tool means such that when the control means causes the transfer means to move the coldworking tool means from a first position, located at the work axis, through an intermediate position between the work axis and fluid delivery means to a second position located adjacent to the fluid delivery means, the fluid port means will be aligned with and matably connected to the fluid delivery means to allow fluid to flow from the fluid delivery means into the fluid port means. There is also provided a coldworking tool assembly having means for monitoring the distance travelled by the mandrel thereof so that the amount of mandrel travel can be controlled to accommodate variations in machine tooling which contacts the workpiece and therefore avoid the mandrel tip impacting the tooling.

The foregoing and additional advantages and characterizing features of the present invention will become clearly apparent upon a reading of the ensuing detailed description together with the included drawing wherein:

BRIEF DESCRIPTION OF THE DRAWING FIGURES

DETAILED DESCRIPTION OF THE ILLUSTRATED EMBODIMENTS

In certain types of fastening operations the hole in the workpiece is expanded to a predetermined size prior to fastener insertion by coldworking the hole. Coldworking is a process of plastically deforming metal at a temperature below its annealing point in order to increase the hardness and tensile strength of the workpiece around the hole to thereby resist localized stress concentrations.

In a basic coldworking tool assembly a collapsible mandrel is extended from a tool housing and inserted in collapsed form through the hole in the workpiece whereupon the mandrel is expanded by a rod extended within the mandrel and then the expanded mandrel is pulled back through the hole to coldwork the hole.

Heretofore such coldworking tools have not been completely automated as an integral component of an automatic fastening machine and its fastener installation cycle. Furthermore, the repeated movement between the afore-mentioned rod and mandrel creates wear between these components and therefore the need for lubrication thereof. Also, variations in the tooling of the fastening machine which contacts the workpiece creates the need for controlling the amount of travel.

In the fastening machine of the present invention including a transfer assembly movable on the machine frame, a coldworking tool assembly is carried either by the transfer assembly or by one of the machine tools carried by the transfer assembly and so positioned relative to the other tools so that upon movement of the transfer assembly to move one of the other tools out of alignment with a work axis of the workpiece, the coldworking tool assembly is moved into alignment with that work axis for coldworking the hole in the workpiece. Furthermore, when the coldworking tool assembly is moved by the transfer means out of alignment with the work axis the coldworking tool assembly is moved into operative engagement with a means carried by the machine frame for lubricating the coldworking tool assembly. There is also provided an improved coldworking tool assembly having means for monitoring the distance travelled by the mandrel thereof so that the amount of mandrel travel can be controlled to accommodate variations in the fastener machine tooling which contacts the workpiece.

Figure 1:
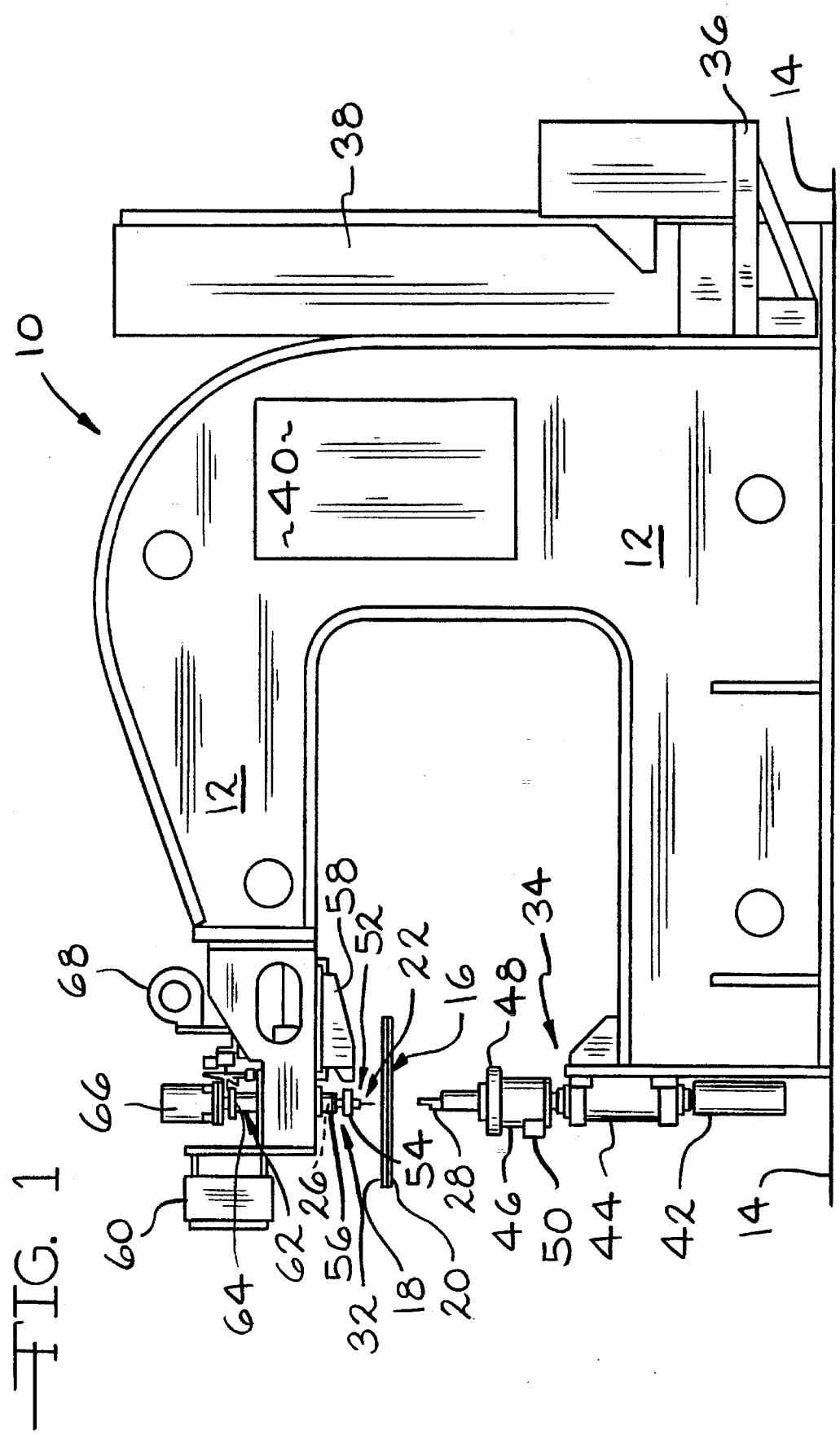
FIG. 1 is a side elevational view of an automatic fastening machine to which the present invention is applicable.

FIG. 1 shows one form of an illustrative automatic fastening machine to which the present invention is applicable and it is in the form of an automatic drilling and riveting machine, generally designated 10. Machine 10 includes a generally C-shaped frame 12 supported on a surface 14, such as the floor of a factory. Briefly, a workpiece 16 comprising two metal worksheets 18, 20 to be joined is introduced into the C-shaped jaws of the machine 10 and clamped together by pneumatic and/or hydraulic pressure in a known manner. This holds the sheets 18, 20 during the drilling operation, assuring exact hole alignment and eliminating burr formation on the inside surfaces. Typically the first operation performed by machine 10 on workpiece 16 is drilling a hole at a location where the center of the hole is on what is defined as the work centerline. After the hole is drilled in workpiece 16 by machine 10, an air cylinder or other suitable motive means moves a transfer assembly to shuttle the drill out of position and centers another tool, for example a hole inspection assembly, generally designated 22, over the hole. A probe assembly portion of the inspection assembly 22 is then moved axially along the work centerline or drilling and riveting axis, i.e. vertically as viewed in FIG. 1, to move the probe assembly to a centered position inside the hole for measuring characteristics including the entire periphery of the hole. This hole information is fed to a central processor unit associated with machine 10 having an output device which, for example, can be a printer, a CRT, or a magnetic storage tape. If the hole measurements are acceptable and within a range of parameters, the probe is removed and a rivet insertion device (not shown) is centered over the hole. A rivet (not shown) is inserted and squeezed or upset by the hydraulic pressure applied from above by a bucking ram 26 and from below by a lower anvil 28 in a known manner. This forms an upper and a lower head on the rivet which serves to hold the metal worksheets 18, 20 together. A rivet head milling tool, then moves into operative position with respect to the upper rivet head to shave the material above the upper surface of upper metal sheet 18 down to the surface of the sheet 18. The machine cycle is completed very quickly and all functions are precisely controlled.

It is to be understood that the automatic drilling and riveting machine 10 shown in FIG. 1 is an illustrative example of many types of automatic machine tool apparatus to which the present invention is applicable. Accordingly, the following description of machine 10 is to facilitate an understanding of the manner in which a coldworking tool assembly is incorporated in machine 10 according to the present invention and as an integral part of the machine operating cycle. As shown in FIG. 1, machine 10 includes an upper head assembly 32 and a lower head assembly 34 both carried by frame 12. Both upper and lower assemblies 32 and 34, respectively, are mounted on frame 12 so that a work centerline alignment is maintained between their respective tooling, i.e. the lower anvil 28 and selectively an upper head tool such as a drill, the bucking ram, hole inspection assembly, milling tool and a coldworking tool assembly as will be described. Platform 36 is part of an hydraulic pumping assembly on the opposite end of the frame 12, and electrical controls are located within a housing 38 on frame 12 adjacent platform 36. Hydraulic controls are located on a panel 40 mounted on the web or central vertical section of frame 12. Pneumatic controls are located on a panel (not shown) at a corresponding location on the opposite side of frame 12. The electrical, hydraulic and pneumatic controls are collectively referred to as the machine control.

The lower head assembly 34 includes an upset cylinder 42 and a lower ram 44 combined to form a tandem cylinder, a clamp cylinder 46, a turntable 48 and the lower anvil 28. Operation of lower head assembly 34 is monitored by a lower head controller connected to the central processor and mounted on clamp cylinder 46. The lower head controller receives inputs from an upset force sensor and an upset pressure sensor both mounted on upset cylinder 42 and inputs from a clamp force sensor and clamp position detector mounted on clamp cylinder 46. A clamp position detector outputs to the lower head controller a voltage signal proportional to the linear displacement of clamp 46. The lower ram 44 is free to reciprocate vertically along the work centerline within a cylindrical cavity. Upset cylinder 42 moves lower ram 44 as necessary to perform the upsetting operation. The turntable 48 to which lower anvil 28 attaches mounts on lower ram 44.

The upper head assembly 32 includes a pressure foot assembly, generally designated 52, which is the upper member of the clamping arrangement of machine 10. The workpiece 16 is clamped against the lower surface of a pressure foot bushing (not shown) depending from a pressure foot plate of the upper head assembly 32 by pressure from the lower ram assembly 44, which raises the lower anvil 28 against the lower surface of workpiece 16. The pressure foot assembly 52 of the illustrated automatic fastening machine 10 preferably includes a pair of spaced apart pneumatic cylinders, one of which is designated 56 and the other of which is parallel with the behind cylinder 56 in FIG. 1., that provide rigid clamping pressure on the upper surface of workpiece 16 during the drilling and hole inspection operations and resilient pressure during upset of the rivet to prevent dimpling of the workpiece 16. The upper head assembly 32 also includes a hopper 58 for holding each rivet prior to insertion into the hole drilled in the workpiece 16 and an operator console panel 60 containing various controls for machine 10.

The upper head assembly 32 further includes a drill spindle assembly, generally designated 62, for drilling the rivet receiving hole in the workpiece 16, an upper anvil and rivet fingers, and a bucking ram. An encoder is associated with upper anvil 26 and another encoder is associated with the bucking ram. These encoders supply the lower head controller with travelling movement information for processing by the central processor. The rivet fingers provide for catching and supporting the rivet released from hopper 58 and then for aligning the rivet along the work centerline for inserting the rivet into the hole in a known manner. This occurs only after the hole inspection assembly has moved the hole probe 22 along the work centerline to position the probe inside the hole to thereby determine that the hole has been drilled to specification including being properly aligned along the work centerline. Movement of hole probe 22 is signalled to the transfer assembly by a hole probe encoder connected to a transfer assembly controller. The bucking ram then provides for bucking the rivet head with anvil 26 while upset pressure is applied from below by the lower ram 44. Bucking ram pressure is controlled by a sensor connected to the transfer controller.

The drill spindle assembly 62 includes a drill ram 64 movable linearly toward and away from workpiece 16. The drill spindle is rotatably mounted in drill ram 64 and is provided with a depending drilling tool facing the workpiece 16. Rotational movement of the drill spindle is provided in the illustrated apparatus by a direct drive electric or hydraulic motor 66 while drilling thrust and feed are measured by a sensor and an encoder and fed to a drill controller. Motor 66 is carried by ram 64 and the output shaft of motor 66 is directly connected to the drill spindle such that the respective axes of rotation of the motor output shaft and drill spindle are coincident. If motor 66 is electric, a fan 68 is preferably provided to cool motor 66 during operation of machine 10.

In accordance with the present invention a coldworking tool assembly is incorporated in riveting machine 10 as an integral part of the operating cycle of machine 10. As previously mentioned, the coldworking tool assembly can be carried either by the transfer assembly of machine 10 or by one of the other tools carried by the transfer assembly. The coldworking tool assembly is so positioned relative to the other tools of machine 10 carried by the transfer assembly that upon movement of the transfer assembly to move one of the other tools out of alignment with the work centerline axis, the coldworking tool assembly is moved into alignment with the work axis for coldworking the hole in the workpiece.

Figure 2:
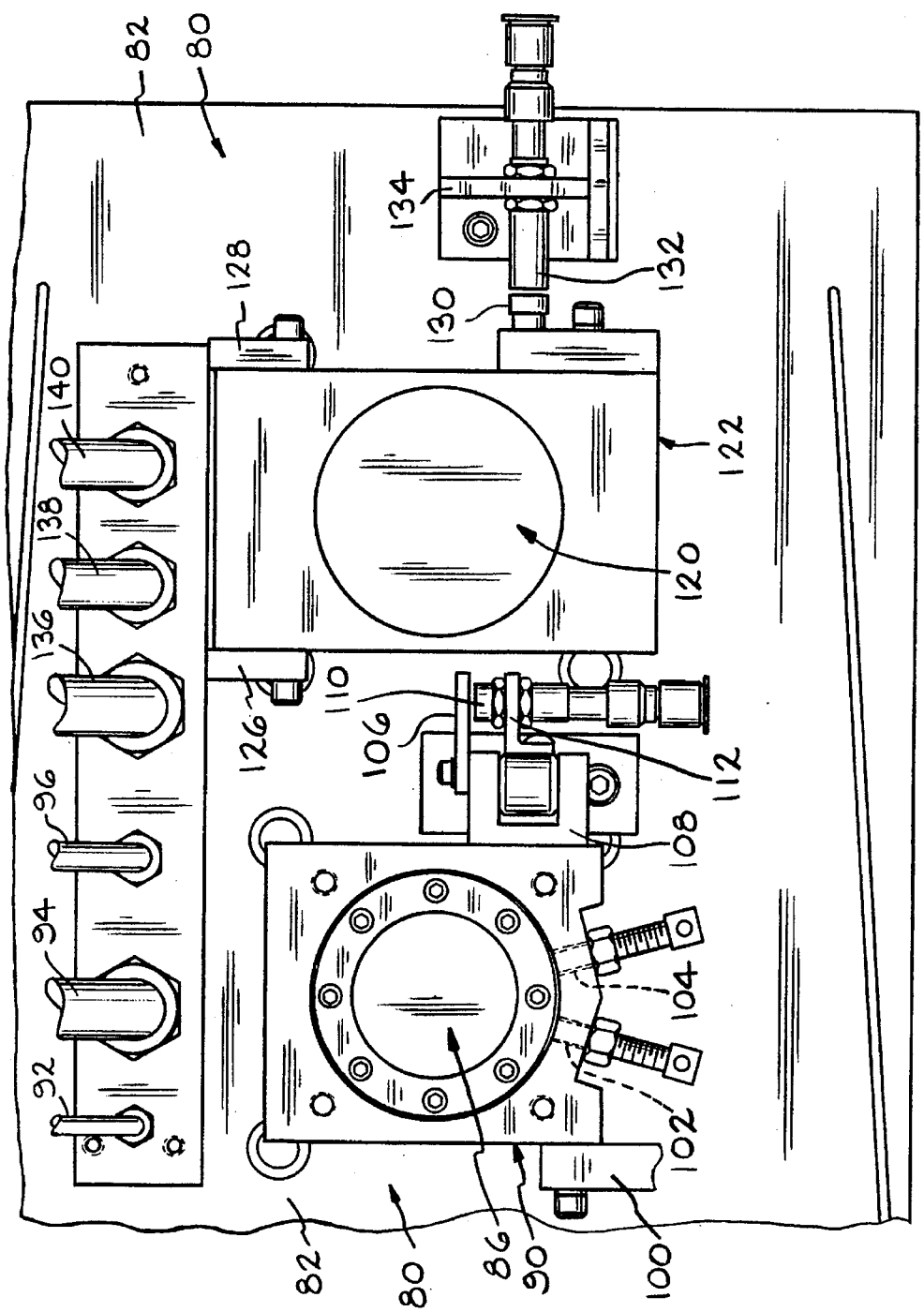
FIG. 2 is an enlarged, fragmentary top plan view of a transfer assembly in a machine of the type shown in FIG. 1 and illustrating one arrangement for incorporating a coldworking tool assembly according to the present invention.

FIG. 2 shows a transfer assembly in a machine of the type in FIG. 1 and illustrates one arrangement for incorporating a coldworking tool assembly according to the present invention. A portion of a transfer plate or member 80 is shown fragmentarily in FIG. 2 and has a top or upper surface 82. Transfer plate 80 is movably mounted in the machine frame in a known manner and is moved horizontally, i.e. in the plane of the paper as viewed in FIG. 2, by a motive means (not shown), for example an hydraulic or pneumatic cylinder. Thus, transfer plate 80 is movable in a plane perpendicular to the above-mentioned work axis which is disposed substantially perpendicular to the plane of the workpiece in a known manner. Each of the machine tools is carried by transfer plate 80 with the tool axis perpendicular to the plane of transfer plate 80 so that upon movement of the transfer plate the work axis of the respective tools are selectively movable into and out of registry or alignment with the work axis. Each tool, in turn, is movable along its respective tool axis toward and away from the workpiece.

For example, one of the aforementioned tools, such as the rivet head milling tool, is designated 86 in FIG. 2 and the tool axis thereof is disposed perpendicular to the plane of the paper as viewed in FIG. 2. Tool 86 is included in an assembly generally designated 90 which has a component fixed or otherwise mounted to transfer plate 80 and another component movable relative to transfer plate 80 which together with the aforementioned motive means provides movement of rivet head milling tool 86 toward and away from the workpiece. Fluid lines designated 92, 94 and 96 in FIG. 2 are part of a fluid circuit to provide operating fluid for the aforementioned motive means as well as fluid motor means for operating the tool. Various components shown in FIG. 2 monitor the movements of tool 86 toward and away from the workpiece. For example, there is provided a component 100 for mounting an encoder, a pair of proximity switches 102 and 104, a sensing plate 106 mounted to guide bracket 108 fixed to assembly 90 and a sensor 110 operatively associated with plate 106 and mounted to a part 112 upstanding from transfer plate 80.

In the arrangement illustrated in FIG. 2, the coldworking tool is carried by transfer plate 80. The coldworking tool is designated 120 and is included in an assembly generally designated 122 which has a component fixed to transfer plate 80 and another component movable relative to the transfer plate. The latter which can comprise a fluid operated motive means provides movement of the coldworking tool toward and away from the workpiece. Components 126 and 128 associated with assembly 122 serve as encoder mounts and also as anti-rotation members for the tool 120 and assembly 122. Movement of the aforementioned motive means is monitored by an arrangement including a sensing element 130 carried by the motive means and sensor 132 carried by a bracket 134 fixed to transfer plate 80. Fluid lines 136, 138 and 140 are part of a fluid circuit to provide operating fluid for the aforementioned motive means as well as fluid operated means for operating the coldworking tool.

Figure 3:
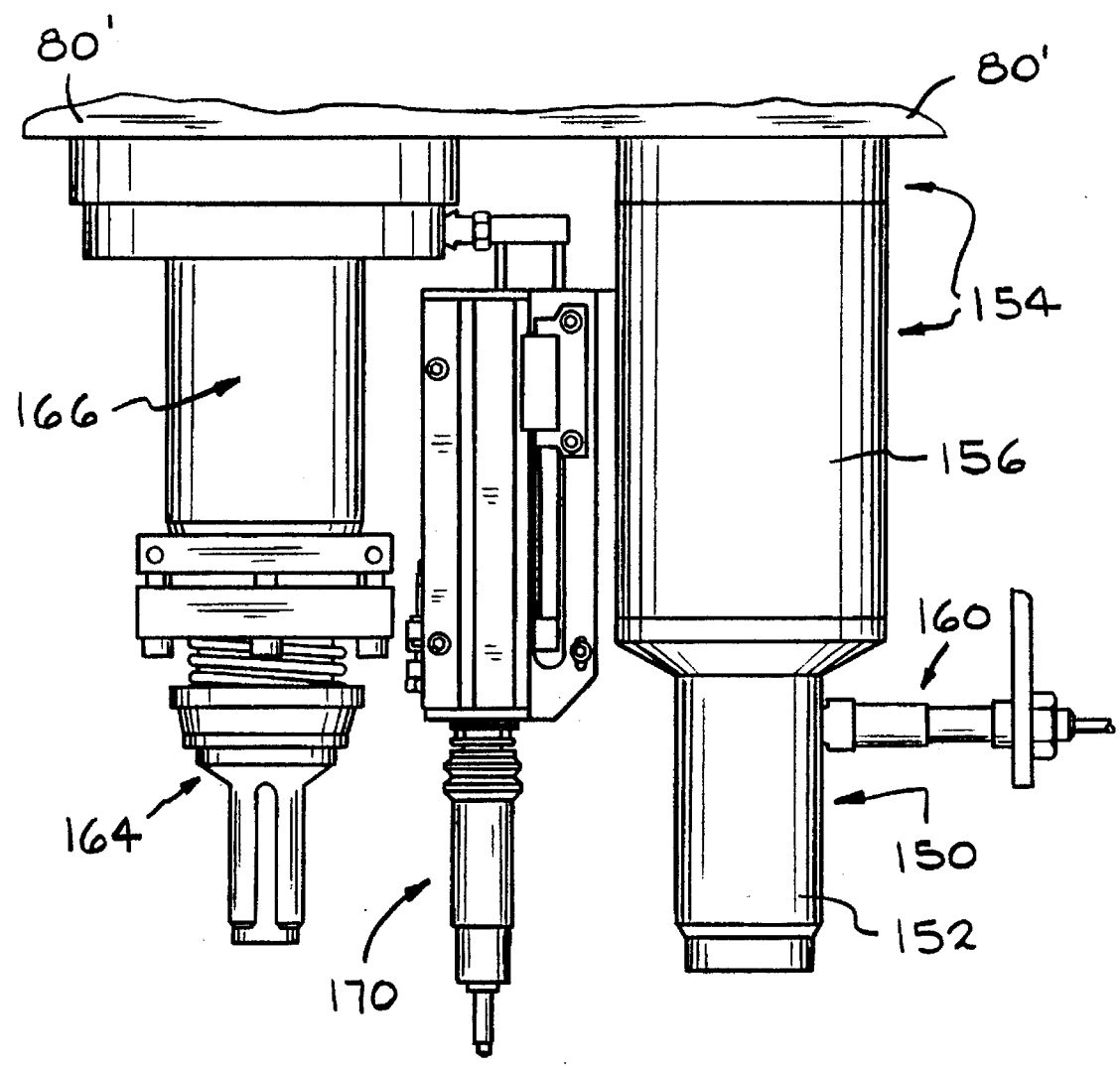
FIG. 3 is an enlarged fragmentary side elevational view of a portion of a tool arrangement and transfer assembly in a machine of the type shown in FIG. 1 and illustrating another arrangement for incorporating a coldworking tool assembly according to the present invention.

FIG. 3 is another illustration of a transfer assembly in a machine of the type shown in FIG. 1 and shows a coldworking tool 150 in more detail. Coldworking tool 150 includes a housing generally designated 152 and a mandrel (not shown in FIG. 2) is located in the housing and is extendable from housing 152 to operate on the workpiece in a manner which will be described. A motive means 154 such as an hydraulic cylinder is designated 156 and is operatively connected to housing 152 and is carried by transfer means or plate 80'. Operation of motive means 154 moves coldworking tool 150 toward and away from the workpiece in a manner which will be described. In the arrangement illustrated in FIG. 3 coldworking tool 150 has been moved by transfer means 80' to a position where the coldworking tool axis is spaced a distance from the workaxis of the workpiece. In the position of coldworking tool 150 shown in FIG. 3 it is in operative relationship with means generally designated 160 for supplying fluid to coldworking tool 150 during a cycle of operation of the machine in a manner which will be described.

In the illustrative arrangement of FIG. 3 another tool, such as a rivet upset tool, is generally designated 164 and is carried by transfer means 80' through a motive means 166 for moving tool 164 toward and away from the workpiece in a known manner. Also in the arrangement of FIG. 3 there is shown a hole probe device generally designated 170 which is carried by the movable component of a tool, for example rivet upset tool 164, for moving the hole inspection device toward and away from the workpiece. For a more detailed description of such a hole probe device and the manner of mounting it to one of the other tools in an automatic fastening machine, reference may be made to pending U.S. patent application Ser. No. 07/971,890 filed Nov. 4, 1992 entitled "Hole Probe Method and Apparatus", now U.S. Pat. No. 5,329,691, and assigned to the assignee of the present invention. If desired, in an alternative arrangement, the coldworking tool can be carried by the movable component of a tool, such as the rivet shaving tool previously described, in a manner similar to the hole probe device.

Figure 4:
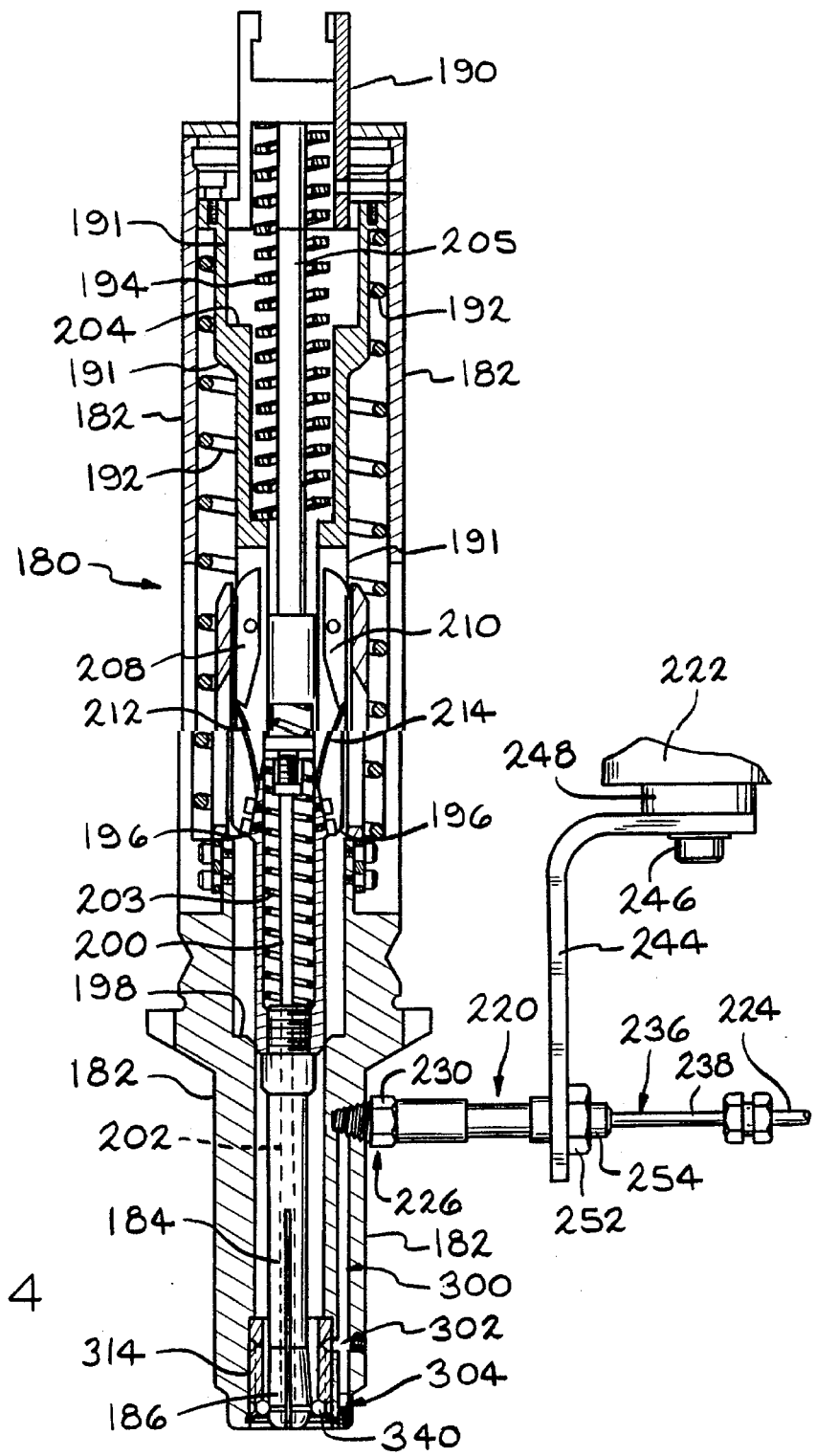
FIG. 4 is a longitudinal sectional view of a form of coldworking tool assembly which can be incorporated in the machine of FIGS. 1–3 according to the present invention and further illustrating a means for lubricating the coldworking tool assembly during the machine operating cycle.

FIG. 4 shows a form of coldworking tool 180 which can be incorporated in the machine of FIGS. 1–3. For a more detailed description of the tool of FIG. 4 reference may be made to U.S. Pat. No. 4,869,091 issued Sep. 26, 1989 entitled "Tool For Coldworking Holes", the disclosure of which is hereby incorporated by reference. Briefly, tool 180 comprises a housing 182, a mandrel 184 carried in housing 182 and having a collapsible end portion 186 and a mechanism within housing 182 for moving mandrel 184 relative to housing 182 for coldworking the hole in the workpiece. In operation, the coldworking tool 180 is positioned by the transfer means mentioned in connection with FIGS. 1–3 so that the longitudinal axis of housing 182 is in alignment with the workaxis of the workpiece. Then tool 180 is moved along that axis toward the workpiece by suitable means such as an hydraulic cylinder (not shown) to a position where the lower end of housing 182 as viewed in FIG. 4 is in close proximity to the workpiece. Then force is applied to coupling 190 by suitable means such as another hydraulic cylinder (not shown). This through the sleeve 191 compresses the outer coil spring 192 which is less stiff than the inner coil spring 194, and this compression continues until an annular shoulder 196 on sleeve 191 contacts an inner annular shoulder 198 of housing 182. The foregoing causes movement of mandrel 184 along housing 182 so that the collapsible end or head portion 186 is out of the housing 182 and located in and through the hole in the workpiece.

Next, a support member in the form of a rod or pin 200 is moved along within an axial bore or passage 202 within mandrel 184 to provide support within the collapsible end portion 186. This is accomplished by applying continued force to member 190 thereby compressing the coil springs 194 and 203 and moving ram 205 until coupling 190 contacts the annular step surface 204 in sleeve 191. At this position, the lower portion of pin 200 as viewed in FIG. 4 is within the collapsible end portion 186 of mandrel 184 which end portion 186 is within the hole in the workpiece. During the foregoing operation, lever members 208 and 210 are pivoted inwardly under the action of leaf springs 212 and 214, respectively, to lock pin 200 in the aforementioned position.

The hole in the workpiece is coldworked by applying a force to member 190 in the opposite direction, such as by operating the aforementioned hydraulic cylinder in the opposite direction, thereby drawing the lower end 186 of mandrel 184 upwardly through the hole thereby coldworking it in a known manner. During the foregoing operation coil springs 192 and 194 initially will begin to decompress but coil spring 203 does not because it remains locked in place by levers 208 and 210. Further upward movement of coupling 190 causes lever members 208 and 210 to move upwardly as shown in FIG. 4 thereby pivoting them back to their original positions with the result that spring 203 is allowed to decompress allowing pin 200 to be retracted from the end portion 186 of mandrel 184.

To summarize a basic machine cycle operation including coldworking tool 180, when the workpiece has been properly positioned and a machine cycle is initiated by appropriate controls to the machine central processor, the pressure foot lowers and the upset cylinder actuates the clamp cylinder and causes the lower head assembly to rise as described in connection with FIGS. 1–3. This clamps the workpiece firmly between the pressure foot of the lower anvil and the underside of the bushing on the pressure foot. The clamped condition of the workpiece is signalled to the lower head controller to initiate the drilling cycle. The drill spindle is rotated by the drill motor and the drill ram is moved downward to drill the workpiece and thereby locate the hole in the workpiece, whereupon the drill ram is retracted. During the drilling cycle a rivet is removed from the hopper and placed in rivet fingers associated with the upper anvil.

Completion of drill spindle retraction initiates movement of the transfer assembly to move the drill so that the axis thereof is out of alignment with the workaxis and to move coldworking tool 180 so that the longitudinal axis of housing 182 is in alignment with the workaxis of the workpiece. Then tool 180 is moved along that axis toward the workpiece and the hole is coldworked all in a manner as described in connection with FIG. 4 whereupon tool 180 is moved along the workaxis away from the workpiece. When coldworking tool 180 reaches the fully retracted position, the machine processor then initiates the machine transfer controller to cause the transfer assembly to move coldworking tool 180 out of alignment with the work centerline. Then transfer assembly moves the bucking ram over the work centerline and the ram down strokes to move the anvil downward to engage the rivet held in the rivet fingers to insert the rivet into the predrilled and coldworked hole in the workpiece and to buck the upper head of the rivet in preparation for upsetting pressure from the lower ram. Rivet upset then is performed by actuating the lower ram hydraulic cylinder forcing the lower anvil to rise and upset the rivet.

Upon rivet upset, the lower ram descends to its working stroke height and the transfer assembly moves a milling tool over the upset rivet along the work centerline to shave the material down to the surface, as is well known to those skilled in the art. This completes the machine cycle and the workpiece then is repositioned for the next machine cycle.

Figure 5:
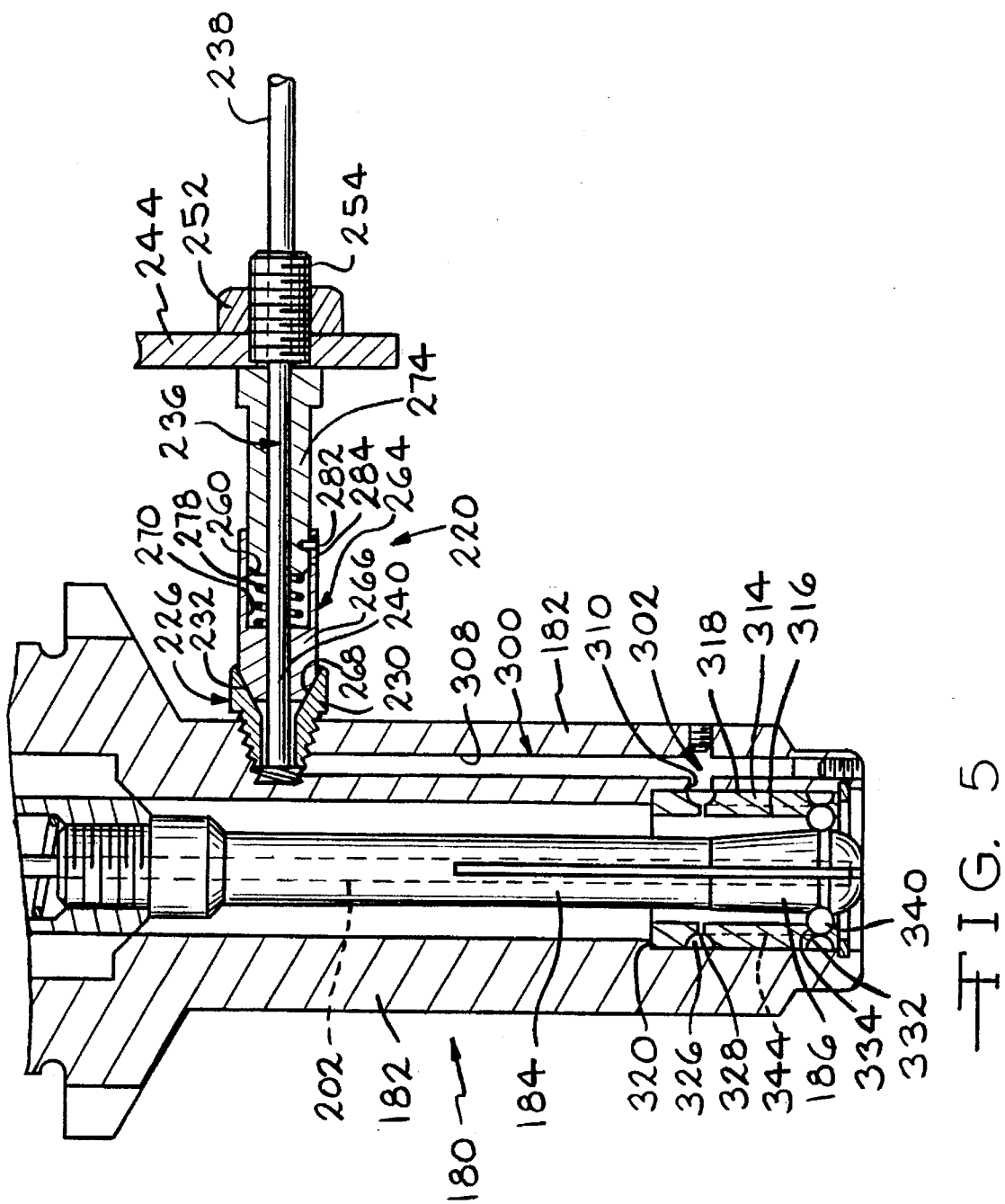
FIG. 5 is an enlarged fragmentary sectional view, partly diagrammatic, of the lubricating means of FIG. 4.

In accordance with the present invention, the automatic fastening machine is provided with the capability of automatically lubricating coldworking tool 180, in particular there is provided an automatic fastening machine wherein lubrication of the coldworking tool 180 is provided as part of the fastener insertion cycle of the automatic machine operation. Referring to FIGS. 4 and 5, there is provided fluid delivery means generally designated 220 carried by the machine frame 222 and adapted for connection to a source 224 of fluid used by coldworking tool 180, i.e. a source of lubrication fluid. The coldworking tool 180 is provided with fluid port means generally designated 226 for receiving fluid for use by the coldworking tool, i.e. the lubrication fluid. The fluid port means 226 is positioned on tool 180 such that when the machine control causes the transfer means to move the coldworking tool 180 from a first position located at the work axis through an intermediate position between the work axis and the fluid delivery means 220 to a second position located adjacent to the fluid delivery means 220, the fluid port means 226 will be aligned with and matably connected to the fluid delivery means 220 to allow fluid to flow from the fluid delivery means to the fluid port means 226.

As shown in more detail in FIG. 5, the fluid port means 226 is provided by a fitting 230 threaded into an opening in the wall of coldworking tool housing 182 and having an inwardly tapering interior passage 232. The fluid delivery means 220 comprises conduit means 236 having a first end 238 for connection to the source of fluid 224 and a second end 240 adapted to be received in fitting 230 as shown in FIG. 5 when the coldworking tool 180 is in the second position described above. Conduit means 236 is carried by supporting means in the form of an L-shaped bracket 244 secured at one end by fastening means 246 to a portion 248 of the machine frame and having an opening at the other end through which conduit means 236 extends and is fixed therein by the combination of a nut 252 and hollow bolt 254. Thus, conduit 236 is fixed in position and tool 180 is moved into position where fitting 230 mates with the conduit end 240.

The fluid delivery means 220 also includes shock absorbing means generally designated 260 for absorbing impact force generated when coldworking tool 180 is moved into the second position described hereinabove where conduit end 240 mates with fitting 230. As shown in FIG. 5, shock absorbing means 260 comprises a shock absorbing head 264 in the form of a body 266 having a tapered end 268 adapted to fit into the inwardly tapering passage 232 of fitting 230 in substantially fluid-tight relation and an opposite end from which a recess 270 of substantially constant diameter extends axially inwardly for about half the length of body 266. There is also provided a support member 274 in the form of a cylindrical sleeve which is fitted on conduit 236 and located with one end abutting bracket 244 and with the opposite end slidably received in recess 270 of shock absorber body 266. A spring 278 is located in recess 270 between an inner end wall of the recess and the end of member 274 for biasing the shock absorbing head 264 and support member 274 relative to each other and for absorbing impact force when coldworking tool 180 is moved into position mating with the fluid delivery means 220.

There is also provided means operatively associated with shock absorbing head 264 and support member 274 for limiting the amount of relative movement therebetween. In particular, the foregoing is accomplished by a pin 282 fixed to supporting member 274 and projecting radially outwardly from the outer surface of member 274 and a slot 284 provided along the wall of head 264 in communication with recess 270 and receiving pin 282. Slot 284 extends parallel to the common longitudinal axis of head 264 and supporting member 274 and the length of slot 284 determines the amount of relative movement. In addition, the combination of nut 252 and hollow bolt 254 can be utilized to adjust the amount by which conduit end 240 extends axially beyond the tapered end 268 of shock absorbing head 264.

In operation, when coldworking tool 180 reaches the second position described hereinabove, which second position is illustrated in FIGS. 4 and 5, this is sensed by a limit switch or other appropriate sensor (not shown) and signalled to the machine control which then causes the source 224 to supply a predetermined or metered quantity of fluid, i.e. lubricant/coolant, via conduit means 236 to the fitting 230 on tool 180. The fluid flows from fitting 230 to locations in coldworking tool 180 where the fluid is used by components of the tool. The manner and means by which the fluid in conveyed within coldworking tool 180 to those components now will be described.

In accordance with the present invention, coldworking tool 180 is provided with means for providing a fluid distribution path from the fluid port means 226 to the mandrel means 184, in particular to the portion of mandrel 184 including end portion 186. The means for providing the fluid distribution path extends along within tool housing 182 to the end of the housing through which mandrel 184 is extended. Referring to FIG. 5, the means for providing the fluid distribution path includes a first portion generally designated 300 leading from the fluid port means 226, a second portion generally designated 302 in communication with the first portion 300 to supply fluid to the tip of mandrel 184 and a third portion generally designated 304 in communication with the first portion 300 to supply fluid to the operating end portion 186 of mandrel 184 at a location spaced axially inwardly from the tip thereof. As shown in FIG. 5, the first portion 300 of the fluid distribution path is provided by a passage 308 extending longitudinally along with the wall of tool housing 182 and generally parallel to the longitudinal axis of tool 180. At least one radially-inwardly directed passage 310 in communication with passage 308 places the second and third portions of the fluid distribution path in communication with the first portion 300 in the following manner:

There is provided a cylindrical sleeve 314 within the lower end portion of tool housing 182 as viewed in FIGS. 4 and 5 which sleeve 314 has inner and outer surfaces 316 and 318, respectively. Sleeve 314 is held in place between an annular shoulder 320 and a stop ring 322 provided in the inner wall surface of housing 182. The inner diameter of sleeve 314 allows passage of mandrel 184 therethrough. A first annular channel 326 is provided in the outer surface 318 of sleeve 314 near the upper end thereof as viewed in FIG. 5. Channel 326 preferably is semicircular in cross-section and is in fluid communication with passage 310. Sleeve 314 is provided with a plurality of radially directed passages 328 between inner surface 316 and channel 326 for allowing fluid to flow from channel 326 to the portion of mandrel 184 in the vicinity of channel 326.

A second annular channel 332 is provided in the outer surface 318 of sleeve 314 near the lower end thereof as viewed in FIG. 5, and a third annular channel 334 is provided in the inner surface 316 of sleeve 314 in axial alignment or registry with channel 332. The channels 332 and 334 preferably are semicircular in cross-section and are in fluid communication by suitable means such as radially extending passages (not shown) therebetween. An applicator member 340 in the form of a ring of felt or like material is fitted in channel 332 and has an inner diameter of a size such that it is in wiping contact with the tip of mandrel 184. Fluid is supplied to channels 332 and 334 and thus to coating member 340 by a plurality of longitudinally extending, circumferentially spaced slots 344 formed in the wall of sleeve 314, extending inwardly from outer wall 316, and placing channel 326 in fluid communication with channels 332 and 334. Thus, as mandrel 184 reciprocates within tool housing 182, coating member 340 applies a thin coating of the lubricant/coolant liquid to the surface of the mandrel tip and additional liquid is applied to mandrel portion 186 via passages 328.

Figure 6:
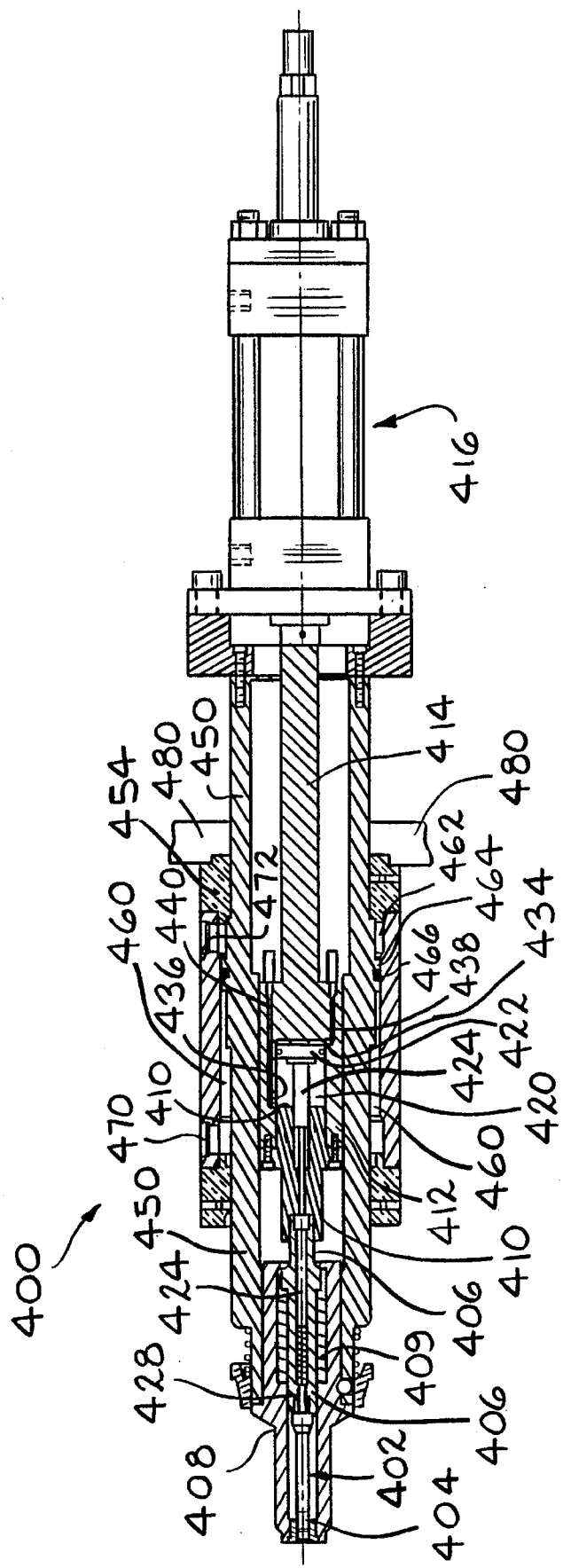
FIG. 6 is a longitudinal sectional view, partly in elevation, of an improved coldworking tool assembly according to the present invention.
Figure 7:
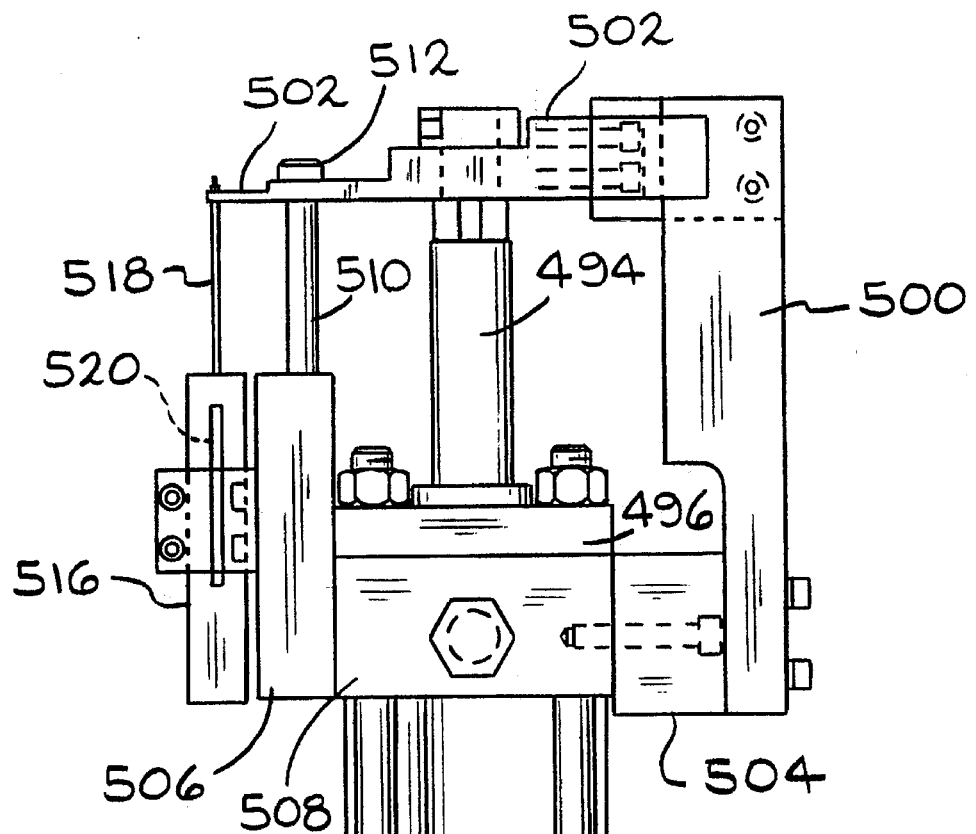
FIG. 7 is a fragmentary elevational view of a portion of the coldworking tool assembly of FIG. 6 and showing the means for monitoring mandrel travel according to the present invention.
Figure 7:
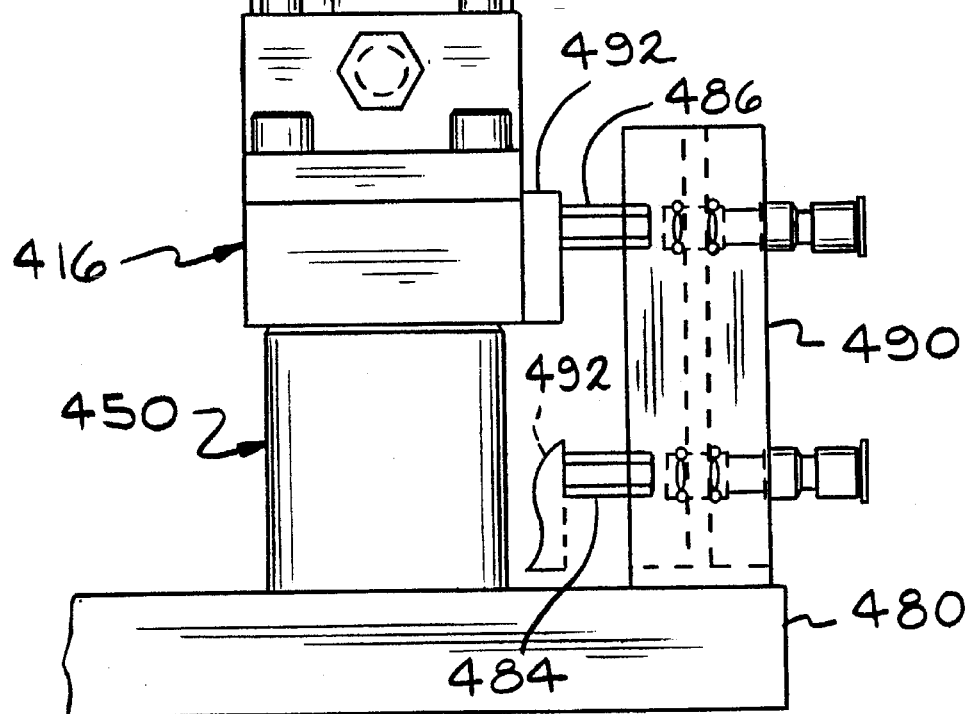

FIGS. 6 and 7 show a coldworking tool 400 according to the present invention having means for monitoring the distance travelled by the mandrel thereof so that the amount of mandrel travel can be controlled to accommodate variations in machine tooling which contacts the workpiece and therefore avoid the mandrel tip impacting the tooling. Referring first to FIG. 6, the coldworking tool 400 includes a mandrel 402 having a collapsible tip 404 at one end and joined at the other end to a mandrel connecting rod 406. Mandrel 402 and connecting rod 406 are movable within a mandrel housing 408 against the biasing force of a connecting rod spring 409. Mandrel connecting rod 406, in turn, is joined to a coupling/cylinder cap 410 which is fixed to one end 412 of the rod 414 of an upper hydraulic cylinder assembly 416. In response to operation of cylinder assembly 416, rod 414 is extended from the retracted position of FIG. 6 to move mandrel 402 outwardly from the end of housing 408 for coldworking the hole in the workpiece.

The end 412 of rod 414 is formed to include a cylindrical recess into which a boss-like extension of cap 410 is sealingly received to define an interior fluid chamber 420 containing the piston 422 of an inner hydraulic cylinder assembly. A rod 424 extends from piston 422 axially along within coupling/cylinder cap 410 and mandrel connecting rod 406 whereupon it is joined to a pilot pin 428 which is movable axially within mandrel 402. Operating fluid for the inner hydraulic cylinder assembly is supplied to and removed from chamber 420 by ports 434 and 436 on opposite sides of piston 422. Ports 434 and 436, in turn, are connected by bores or passages 438 and 440, respectively, in the end 412 of rod 414 which passages 438 and 440 are connected to fluid lines 442 and 444 connected to the fluid system of the automatic fastening machine. Pilot pin 428 is shown in FIG. 6 in a position withdrawn from the mandrel collapsible end portion 404. When mandrel 402 is extended from housing 408 during coldworking the workpiece hole in a manner which will be described, pilot pin 428 is moved to an extended position within mandrel portion 404 by introducing fluid to chamber 420 through port 434 on the one side of piston 422 and withdrawing fluid from chamber 420 through port 436 on the opposite side of piston 422. This causes movement of piston 422 from the position shown in FIG. 6 along within chamber 420 to extend pilot pin 428 into mandrel tip portion 404.

The end 412 of rod 414 is slidable along within the inner surface of a cylindrical ram structure 450 which is fixed at one end to a bracket structure 452 on which is mounted the upper hydraulic cylinder assembly 416. The mandrel housing 408 is fixedly mounted within the other end of ram structure 450. Ram structure 450, in turn, is slidably axially movable within a lower hydraulic cylinder structure 454. In particular, the opposite axial ends of cylindrical structure 454 are in slidable, fluid tight relation with the outer surface of ram structure 450. Between those opposite axial ends of structure 454 the inner diameter thereof is larger than the outer diameter of ram structure 450 to define an annular open region. This region, in turn, is divided into two separate portions 460 and 462 by an annular enlargement 464 on the outer surface of ram structure 450. Enlargement 464 is in sliding, fluid tight relation with the inner surface of cylinder structure 454 by virtue of a seal member 466 located in an annular recess in enlargement 464 and contacting the inner surface of structure 454. Operating hydraulic fluid is supplied to and withdrawn from portions 460 and 462 via ports 470 and 472, respectively, which in turn are connected via fittings and lines (not shown) to the machine hydraulic system. Thus, by introducing fluid via port 472 to portion 462 and withdrawing fluid from portion 460 via port 470 ram structure 450 is moved along within cylindrical structure 454 to move the coldworking tool 400 toward the workpiece.

As shown in FIG. 7, ram structure 450 and upper cylinder assembly 416 carried thereby are movable toward and away from the workpiece and relative to a transfer plate 480 of the fastening machine. The end of ram structure 450 is movable through an opening in transfer plate 480, and the adjacent end of cylindrical structure 454 is mounted in a suitable manner (not shown) to transfer plate 480. Thus, the entire coldworking tool assembly is movably supported by transfer plate 480. A pair of position sensors or limit switches 484 and 486 are supported in spaced relation by a post 490 fixed to transfer plate 480. Sensors 484 and 486 are spaced in the direction of travel of ram structure 450. A switch operator component 492 is carried by the bracket structure 452 which moves with ram 450. A post 494 extends outwardly from a bracket 496 mounted on the end of upper cylinder assembly 416. An anti-rotation bracket 500 is fixed at one end by means of an arm 502 to the end of post 494 and is fixed at the other end via a block 504 to the cylinder assembly 416. A bearing block 506 is fixed to a component 508 of upper cylinder assembly 416 which moves with rod 414 thereof which block 506 houses a rod 510 movable therein and connected at the outer end 512 thereof to an extension of arm 502. A linear velocity displacement transducer 516 is carried by block 506 and has a line 518 extending therefrom and fixed to arm 502. Transducer 516 is the type which, briefly, includes an encoder wheel 520 therein around which line 518 is wound so that upon movement of cylinder rod 494 relative to the fixed arm 502 line 518 is extended thereby rotating wheel 520 to generate electrical pulses via photoelectric or other known means to provide a measure of the linear distance travelled by the rod 494 of cylinder assembly 416. The amount of movement of rod 494 corresponds to the amount of movement of rod 414 and thus the amount of movement of mandrel 402. One form of transducer 516 found to perform satisfactorily is commercially available from Trans-Tele. Other linear velocity displacement transducers can of course be employed.

The coldworking tool 400 according to the present invention operates in the following manner. The coldworking tool 400 is moved by transfer plate 480 to a position where the coldworking tool axis, i.e. the longitudinal axis of tool 400, coincides with the work axis of the workpiece which, in turn, extends through the center of the hole in the workpiece. Next, the coldworking tool 400 is moved toward the workpiece. This is accomplished by introducing hydraulic fluid via port 472 to chamber 462 and withdrawing fluid via port 470 from chamber 460 thereby applying force to the annular employment 464 and moving ram structure 450 along within the cylindrical structure 454 to move the coldworking tool 400 including mandrel 402 toward the workpiece. When ram 450 reaches the limit of its travel within cylinder 454, the switch operator 492 is in operative association with position sensor 484 causing it to signal the machine control that the coldworking tool 400 is in the down position, i.e. the position closest to the workpiece.

With the coldworking tool 400 in the down position, mandrel 402 is moved from a first position as shown in FIG. 6 wherein the mandrel is retracted within housing 408, through an intermediate position where mandrel 402 is partially extended from housing 408 but not into the hole in the workpiece to a second position where the mandrel is fully extended from housing 408 and mandrel tip 404 is within the hole in the workpiece. The foregoing is provided by operating the upper cylinder assembly 416 to extend rod 414 from the retracted position shown in FIG. 6 to an extended position to move mandrel 402 outwardly relative to housing 408 and thereby place mandrel tip 404 within the hole in the workpiece. During the operation of cylinder assembly 416, the distance of travel of mandrel 402 is controlled in the following manner. The workpiece thickness, i.e. workpiece stack thickness, and the cavity depth of the tool contacting the opposite side of the workpiece are information inputs provided to the fastening machine control. For a given combination of workpiece thickness and cavity depth, the machine control determines the proper amount of travel of mandrel 402 from the afore-mentioned first position to the second position. As mandrel 402 is moved by rod 414, the distance mandrel 402 moves is sensed by linear velocity displacement transducer 516 and positional signal information on the amount of mandrel travel is sent from transducer 516 to the machine control. When the desired or maximum distance of mandrel travel is reached the machine control stops the operation of cylinder assembly 416.

After a short dwell or time delay, pilot pin 428 is moved to an extended position within mandrel portion 404 by operating the inner hydraulic cylinder assembly as previously described. In particular, fluid is introduced through port 434 on one side of piston 422 and withdrawn through port 436 on the opposite side of piston 422 to move piston 422 from the position shown in FIG. 6 to the opposite end of chamber 420. Piston 422 is held or maintained in this position by the operating fluid thereby holding and maintaining pilot pin 428 within mandrel portion 404.

Next, the hole in the workpiece is coldworked by pulling or withdrawing mandrel 402 from the workpiece thereby drawing the expanded mandrel portion 404 through the hole to coldwork the same in a known manner. This is accomplished by operating the upper cylinder assembly 416 to retract rod 414 and return it to the position shown in FIG. 6. During this operation, fluid pressure is maintained against piston 422 thereby holding pilot pin 428 within mandrel portion 404. When the upper cylinder assembly 416 returns rod 414 to the position of FIG. 6 with mandrel 402 removed from the workpiece, the inner cylinder assembly is energized to return piston 422 to the position shown in FIG. 6 thereby retracting pilot pin 428 from mandrel portion 404. This is accomplished by introducing fluid through port 436 on the one side of piston 422 and withdrawing fluid from chamber 420 on the opposite side of piston 422 through port 434.

Finally, coldworking tool 400 is moved to the up position, i.e. in a direction away from the workpiece, by introducing hydraulic fluid via port 470 to chamber 460 and withdrawing fluid from chamber 462 via port 472 to apply force to annular enlargement 464 thereby moving ram structure 450 along within cylindrical structure 454. When ram 450 reaches the limit of its travel in this direction, switch operator 492 is in operative association with sensor 486 causing it to signal the machine control that the coldworking tool 400 is in the up position, i.e. the position farthest from the workpiece. Then, transfer plate 480 can move coldworking tool 400 out of alignment with the work axis in preparation for inserting a fastener in the coldworked hole in the workpiece.

Figure 8:
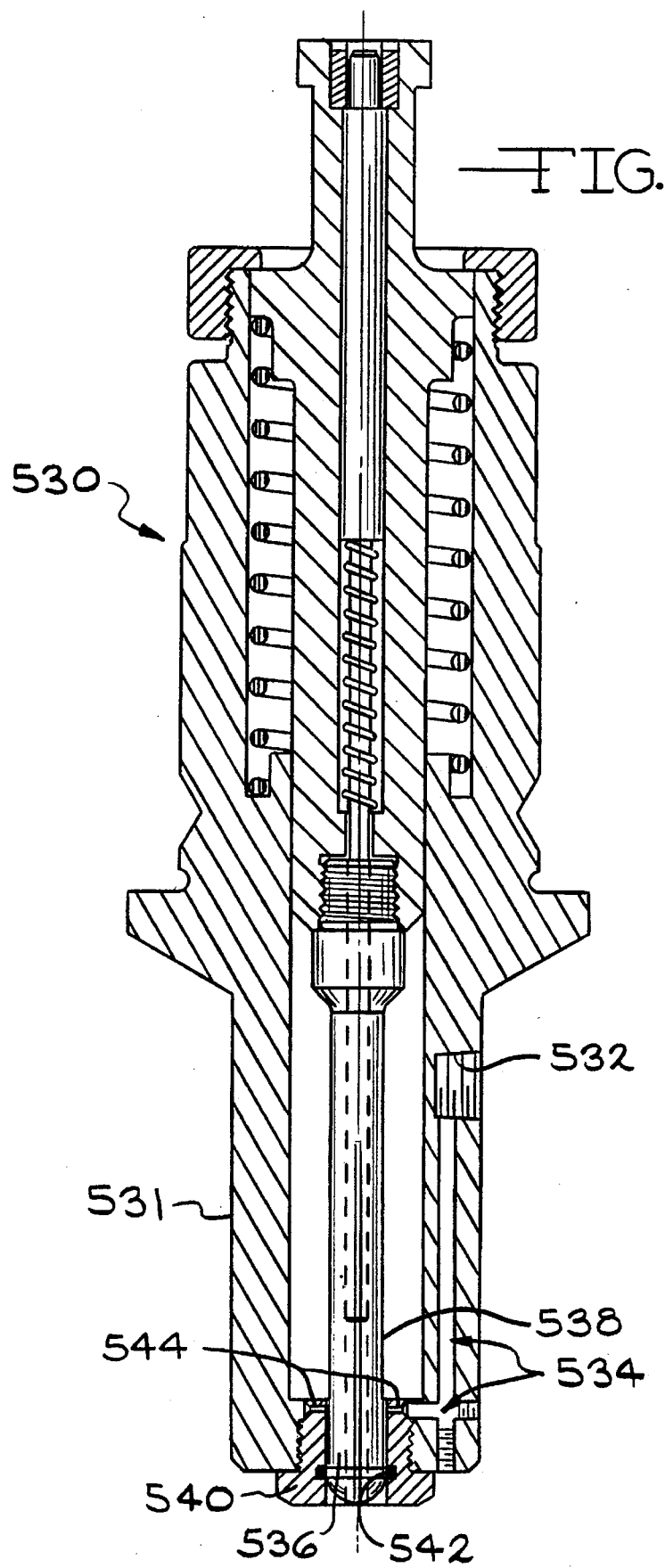
FIG. 8 is a longitudinal sectional view of an alternative embodiment of the tool of FIG. 6.
Figure 9:
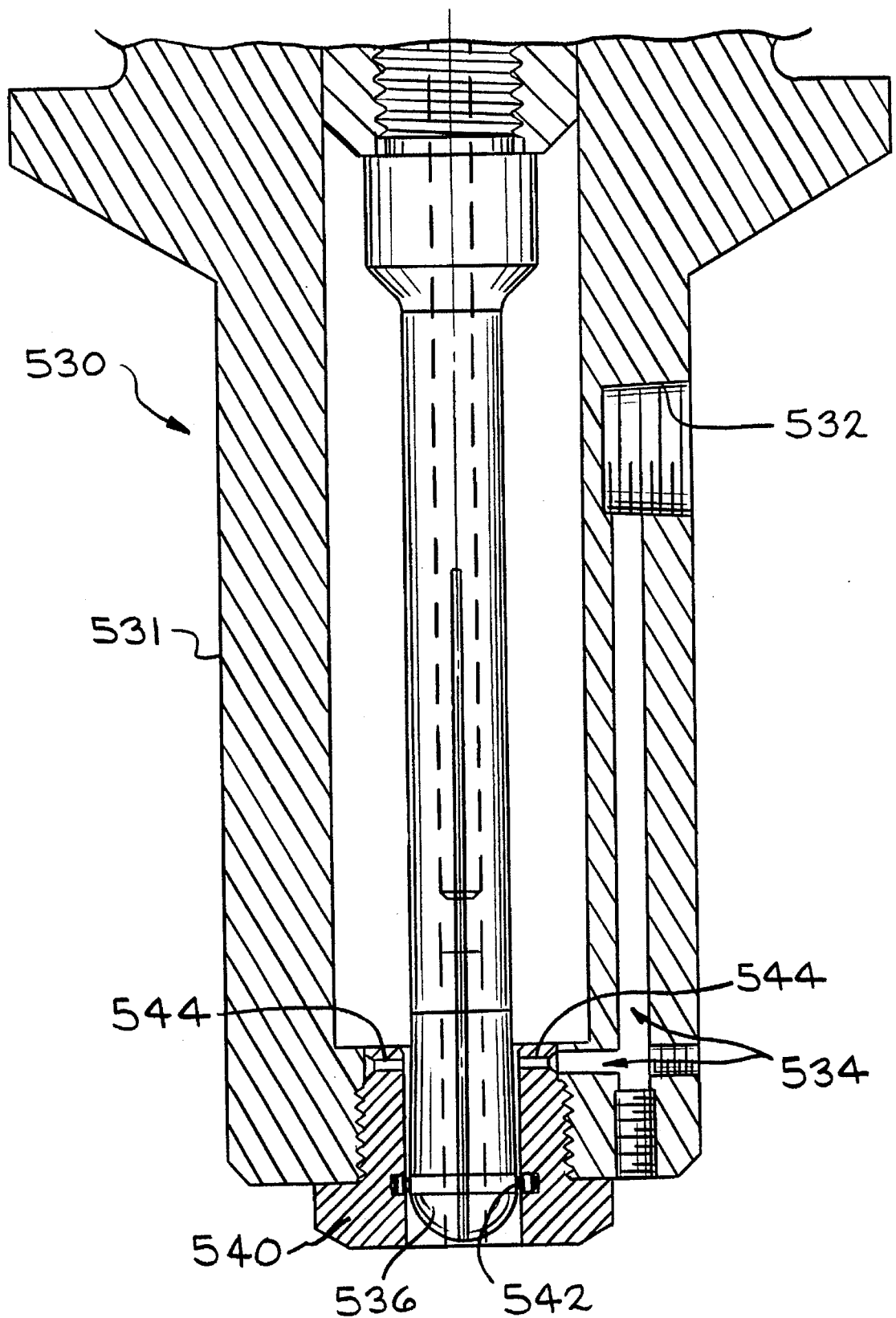
FIG. 9 is an enlarged fragmentary sectional view of the tool of FIG. 8.

FIGS. 8 and 9 show an alternative embodiment of the portion of tool 400 of FIG. 6 providing for automatic lubrication of the tool in a manner like that shown and described in connection with FIGS. 4 and 5. The tool 530 of FIGS. 8 and 9 has a mandrel housing 530 provided with a part 532 to receive a fluid pert means of a fluid delivery means identical to that designated 220 in FIGS. 4 and 5. A fluid distribution path generally designated 534 conveys lubricating fluid to the end portion 536 of a mandrel 538 in a manner similar to that of the arrangement shown and described in connection with FIGS. 4 and 5. As shown in FIGS. 8 and 9, a sleeve 540 in the end of mandrel housing 530 carries an applicator member 542 in wiping contact with mandrel end portion 536 and receives lubrication fluid via passages 544 in fluid communication with path 534.

It is therefore apparent that the present invention accomplishes its intended objects. While embodiments of the present invention have been described in detail, this is for the purpose of illustration, not limitation.

What is claimed is:

1. In an automatic apparatus comprising a frame means defining a work axis in relation to a workpiece positioned for operation thereon by the apparatus; a tool means having a first component carried by the frame means and a second component that is movable towards and away from the workpiece along a tool axis to operate on the workpiece; and a transfer means mounted on the frame means and operatively associated with the tool means for moving the tool means into and out of a working position wherein the tool axis is coincident with the work axis; the improvement which comprises:

a) a cold working tool means carried by the transfer means and defining a coldworking tool axis that is spaced from the tool axis, wherein the coldworking tool means is movable into a position of alignment with the coldworking tool axis being coincident with the work axis when the transfer means moves the tool means out of the working position and wherein the coldworking tool means is then axially movable along the work axis and into and out of a hole provided in the workpiece;

b) control means operatively associated with the transfer means for selectively directing movement of the respective tool means and coldworking tool means into and out of alignment with the work axis, wherein the control means further regulates the axial movement of the coldworking tool means along the work axis to move the coldworking tool means into and out of the hole provided in the workpiece for coldworking the hole; and c) means in said apparatus for supplying fluid comprising lubricant and coolant from an external source to said coldworking tool means when said coldworking tool means is out of alignment with said work axis and as part of a workpiece operation cycle of the apparatus.

2. The automatic apparatus of claim 1, wherein the coldworking tool axis defined by the coldworking tool means is spaced a first determinable distance from the tool axis and wherein the transfer means is directable by the control means to move the tool means the first determinable distance out of positional alignment with the work axis and to move the coldworking tool means into positional alignment with the coldworking tool axis coincident with the work axis and wherein the coldworking tool means regulated by the control means is movable axially along the work axis into and out of the hole.

3. The automatic apparatus of claim 1, wherein the coldworking tool means comprises a mandrel means for coldworking the hole in the workpiece and a housing means, the mandrel means being mounted in the housing means such that the mandrel means is regulated by the control means to be slidable in the housing means in a direction along the coldworking tool axis for coldworking the hole in the workpiece.

4. The automatic apparatus of claim 3, wherein the housing means is elongated having an opening at one end and wherein the mandrel means comprises a collapsible mandrel head, the collapsible mandrel head being extendable and retractable through the opening as the control means regulates the movement of the mandrel means along the coldworking tool axis.

5. The automatic apparatus of claim 4, wherein the mandrel means comprises an expansion means for expanding the collapsible mandrel head.

6. The automatic apparatus of claim 5, wherein when the coldworking tool means is moved axially along the work axis the collapsible mandrel head is movable between a first position located inside the housing means and a second position outside of the housing means and within the hole in the workpiece, the control means causing the expansion means to expand the collapsible mandrel head when the control means moves the mandrel head from the second position to the first position thereby coldworking the hole in the workpiece.

7. The automatic apparatus of claim 3, wherein a first motive means is operatively coupled to said housing means for moving said coldworking tool means toward and away from the workpiece and wherein a second motive means is operatively coupled to said mandrel means for moving said mandrel means along the coldworking tool axis.

8. In an automatic apparatus comprising a frame means defining a work axis in relation to a workpiece positioned for operation thereon by the apparatus, a tool means having a first component carried by the frame means and a second component that is movable towards and away from the workpiece along a tool axis to operate on the workpiece, and a transfer means mounted on the frame means and operatively associated with the tool means for moving the tool means into and out of a working position wherein the tool axis is coincident with the work axis:

a) coldworking tool means;

b) means for operatively coupling the coldworking tool means to the transfer means, the coupling means defining a coldworking tool axis that is spaced a distance from the tool axis wherein the coldworking tool means is movable into a position of alignment with the coldworking tool axis being coincident with the work axis when the transfer means moves the tool means out of the working position, the coupling means including means for moving the coldworking tool means axially along the work axis and into and out of a hole provided in the workpiece;

c) control means operatively associated with the transfer means for selectively directing movement of the tool means and the coldworking tool means into and out of alignment with the work axis, wherein the control means further regulates the axial movement of the coldworking tool means along the work axis to move the coldworking tool means into and out of the hole in the workpiece;

d) fluid delivery means carried by the frame means and adapted for connection to a source of fluid used by the coldworking tool means; and e) the coldworking tool means having a fluid port means for receiving fluid for use by the coldworking tool means, the fluid port means being positioned on the coldworking tool means such that when the control means causes the transfer means to move the coldworking tool means from a first position, located at the work axis, through an intermediate position between the work axis and fluid delivery means to a second position located adjacent to the fluid delivery means, the fluid port means will be aligned with and matably connected to the fluid delivery means to allow fluid to flow from the fluid delivery means into the fluid port means.

9. The automatic apparatus of claim 8, wherein the fluid delivery means comprises conduit means having a first end adapted for connection to the source of fluid and a second end adapted to be received in the fluid port means when the coldworking tool means is in the second position.

10. The automatic apparatus of claim 8, wherein the fluid delivery means includes a shock absorbing means for absorbing impact force generated when the coldworking tool means is moved into the second position mating with the fluid delivery means.

11. The automatic apparatus of claim 10, wherein the shock absorbing means comprises:

a) a shock absorbing head comprising a body having a tapered first end adapted to fit into the fluid port means on the coldworking tool means and a second end, the body of the shock absorbing head having a recess extending partially inwardly from the second end along the body;

b) a support member having an external surface, a first end, and a second end, the support member having a cross-sectional size at the first end such that it fits snugly but movably within the recess in the shock absorbing head;

c) a spring positioned in the recess of the shock absorbing head and contacting the first end of the support member for biasing the shock absorbing head and support member relative to each other and absorbing impact force when the coldworking tool means is moved to the second position mating with the fluid delivery means;

d) means operatively associated with the shock absorbing head and the support member for limiting the amount of relative movement therebetween; and e) bracket means for connecting the support member to the frame means of the automatic apparatus.

12. The automatic apparatus of claim 11, wherein said means for limiting the amount of relative movement between the shock absorbing head and the support member comprises pin means on one of the shock absorbing head and support member engaging slot means on the other of the shock absorbing head and support member.

13. The automatic apparatus of claim 11, wherein the shock absorbing head and the support member have a common longitudinal axis and wherein the fluid delivery means comprises conduit means extending along the longitudinal axis and having a first end adapted for connection to the source of fluid and a second end adapted to be received in the fluid port means when the coldworking tool means is in the second position.

14. The automatic apparatus of claim 13, wherein the shock absorbing means further comprises an adjustment means for adjusting the amount the conduit means protrudes from the tapered end of the shock absorbing head.

15. The automatic apparatus of claim 8, wherein said coldworking tool means comprises:

a) an elongated housing;

b) mandrel means movable along within the housing; and c) means for providing a fluid distribution path from the fluid port means to the mandrel means for supplying the fluid to the mandrel means.

16. The automatic apparatus of claim 15, wherein the mandrel means includes an operating end normally located at one end of the housing and wherein the means for providing the fluid distribution path extends along within the housing to the one end thereof.

17. The automatic apparatus of claim 15, wherein the housing has an opening at one end through which the mandrel means is movable, wherein the mandrel means has an operating end portion terminating in a tip, the mandrel means having a rest position wherein the tip thereof is located in the opening of the housing, and wherein the means for providing the fluid distribution path includes a first portion leading from the fluid port means, a second portion in communication with the first portion to supply fluid to the tip of the mandrel means, and a third portion in communication with the first portion to supply fluid to the operating end portion of the mandrel means at a location spaced from the tip thereof.

18. The automatic apparatus of claim 17, wherein the housing is hollow having a wall extending around the mandrel means, wherein the first portion of the distribution path is provided by first passage means extending longitudinally along within the housing wall and wherein the second and third portions of the distribution path are provided by second and third passage means, respectively, in communication with the first passage means.

19. The automatic apparatus of claim 18, wherein the housing is provided with an internal cylindrical sleeve having a first end, a second end, and inner and outer surfaces, the sleeve being positioned inside the housing such that the sleeve surrounds the operating end portion of the mandrel means in the rest position thereof, the sleeve having a first annular channel in the outer wall surface thereof and located near the upper end of the sleeve, and the sleeve being provided with a plurality of circumferentially spaced passages extending from the inner wall surface to the first annular channel for allowing fluid to flow from the channel to the mandrel means.

20. The automatic apparatus of claim 19, wherein the sleeve has a second annular channel in the outer wall surface thereof located near the lower end of the sleeve, the wall of the sleeve having a plurality of slots extending longitudinally from the first channel to the second channel, the slots for delivering fluid from the first channel to the second channel, a coating member for contacting the mandrel means to apply a fluid film thereto, the inner wall surface of the sleeve having a third annular channel, the third channel being located such that it is in axial alignment with and in fluid communication with the second channel, the coating member positioned within the third channel.

21. The automatic apparatus of claim 20, wherein the coating member comprises felt material, the felt material for providing a thin film of fluid over the mandrel.

22. The automatic apparatus of claim 8, wherein the fluid comprises a lubricant and a coolant.

23. The automatic apparatus of claim 8, further comprising antirotation means operatively associated with said coldworking tool means for preventing rotation of the coldworking tool means so that the fluid port means on the coldworking tool means remains aligned with the fluid delivery means as the coldworking tool means is moved to the second position.

24. A method for automatically coldworking a hole provided in a workpiece utilizing an automatic apparatus comprising a frame means defining a work axis in relation to the workpiece positioned for operation thereon by the apparatus, a tool means having a first component that is movable towards and away from the workpiece along a tool axis to operate on the workpiece, and a transfer means mounted on the frame means and operatively associated with the tool means for moving the tool means into and out of a working position wherein the tool axis is coincident with the work axis, said method comprising the steps of:

a) providing a coldworking tool means carried by the transfer means and defining a coldworking tool axis that is spaced from the tool axis, the coldworking tool means comprising a mandrel means for coldworking the hole in the workpiece and a housing means, the mandrel means being mounted in the housing means such that the mandrel means is movable therein and in a direction along the coldworking tool axis for coldworking the hole in the workpiece, the mandrel means comprising a collapsible mandrel head and expansion means for expanding the collapsible mandrel head;

b) operating the transfer means to selectively move the tool means out of the working position and move the coldworking tool means into a position wherein the coldworking tool axis is in alignment with the work axis;

c) moving the coldworking tool means axially along the work axis so that the collapsible mandrel head is within the hole in the workpiece;

d) moving the mandrel means axially in an opposite direction along the work axis and operating the expansion means to expand the collapsible mandrel head while in the workpiece for coldworking the hole in the workpiece;

e) collapsing the mandrel head and moving the mandrel means back into the housing means;

f) operating the transfer means to move the coldworking means to a position wherein the coldworking tool axis is out of alignment with the work axis; and g) supplying fluid comprising lubricant and coolant from an external source to the coldworking tool means when the coldworking tool means is out of alignment with the work axis and as part of a workpiece operation cycle of the apparatus.

25. A method for automatically coldworking a hole provided in a workpiece utilizing an automatic apparatus comprising a frame means defining a work axis in relation to a workpiece positioned for operation thereon by the apparatus, a tool means having a first component carried by the frame means and a second component that is movable towards and away from the workpiece along a tool axis to operate on the workpiece, and a transfer means mounted on the frame means and operatively associated with the tool means for moving the tool means into and out of a working position wherein the tool axis is coincident with the work axis, said method comprising the steps of:

a) providing a coldworking tool means carried by the transfer means and defining a coldworking tool axis that is spaced from the tool axis, the coldworking tool means having fluid port means for receiving fluid for use by the coldworking tool means;

b) providing fluid delivery means carried by the frame means and adapted for connection to a source of fluid used by the coldworking tool means;

c) operating the transfer means to selectively move the tool means out of the working position and move the coldworking tool means into a position wherein the coldworking tool axis is in alignment with the work axis;

d) moving the coldworking tool means axially along the work axis and into and out of the hole in the workpiece for coldworking the same;

e) operating the transfer means to move the coldworking tool means from a first position, located at the work axis, through an intermediate position between the work axis and fluid delivery means to a second position located adjacent to the fluid delivery means so that the fluid port means is aligned with and matably connected to the fluid delivery means; and f) causing fluid to flow from the fluid delivery means into the fluid port means for use by the coldworking tool means.

26. A coldworking tool for coldworking a hole in a workpiece during operation of an automatic fastening machine, said coldworking tool comprising:

a) housing means adapted to be carried by said automatic fastening machine;

b) a collapsible mandrel located within said housing means and adapted to alternate between original and expanded conditions;

c) means for moving said mandrel between a first position wherein said mandrel is retracted within said housing means, an intermediate position wherein said mandrel is partially extended from said housing but not into the hole in the workpiece, and a second position wherein said mandrel is fully extended from said housing and into the hole in the workpiece;

d) monitoring means operatively associated with said mandrel for monitoring the amount of movement of said mandrel between said first, intermediate and second positions;

e) operator means movable within said mandrel for maintaining said mandrel in said expanded condition;

f) holding means operatively associated with said operator means for maintaining said mandrel in said expanded condition when said mandrel is in the hole in the workpiece to prevent the mandrel from collapsing during coldworking of the hole; and g) control means operatively connected to said monitoring means and to said means for moving said mandrel so that the amount of mandrel movement can be controlled to accommodate variations in dimensions of tooling which contacts the workpiece so as to avoid impact between the mandrel and the tooling.

27. The coldworking tool of claim 26, wherein said housing means comprises:

a) a housing component carried by said fastening machine;

b) a ram component movably carried by said housing component, said mandrel being movable within said ram component; and c) fluid-operated motive means for moving said ram component toward and away from said workpiece.

28. The coldworking tool of claim 27, wherein said means for moving said mandrel comprises:

a) motive means carried by said ram component; and b) connecting rod means between said motive means and said mandrel.

29. The coldworking tool of claim 28, wherein said monitoring means comprises linear velocity displacement transducer operatively connected to said motive means.

30. The coldworking tool of claim 28, wherein said holding means comprises fluid-operated motive means carried by said connecting rod means and operatively connected to said operator means for moving said operator means into and out of said mandrel and for maintaining said operator means in said mandrel during coldworking of the hole.

31. A coldworking tool for coldworking a hole in a workpiece during operation of an automatic fastening machine, said coldworking tool comprising:

a) housing means adapted to be carried by said automatic fastening machine;

b) a collapsible mandrel located within said housing means and adapted to alternate between original and expanded conditions;

c) fluid operated motive means for moving said mandrel between a first position wherein said mandrel is retracted within said housing means, an intermediate position wherein said mandrel is partially extended from said housing means but not into the hole in the workpiece and a second position wherein said mandrel is fully extended from said housing means and into the hole in the workpiece;

d) monitoring means operatively associated with said mandrel for monitoring the amount of movement of said mandrel between said first, intermediate and second positions;

e) operator means movable within said mandrel for maintaining said mandrel in said expanded condition;

f) fluid operated means for moving said operator means and for maintaining said mandrel in said expanded condition when the mandrel is in the hole in the workpiece to prevent the mandrel from collapsing during coldworking of the hole; and g) control means operatively connected to said monitoring means and to said fluid operated motive means for so that the amount of mandrel movement can be controlled to accommodate variations in dimensions of tooling which contacts the workpiece so as to avoid impact between the mandrel and the tooling.

32. The coldworking tool of claim 31, wherein said housing means comprises:

a) a housing component carried by said fastening machine;

b) a ram component movably carried by said housing component, said mandrel being movable within said ram component; and c) fluid-operated motive means for moving said ram component toward and away from said workpiece.

33. The coldworking tool of claim 32, wherein said fluid operated motive means for moving said mandrel is carried by said ram component of said housing means and includes connecting rod means extending to said mandrel.

34. The coldworking tool of claim 33, wherein said monitoring means comprises linear velocity displacement transducer means operatively connected to said fluid-operated motive means.

35. The coldworking tool of claim 34, wherein said fluid operated means for moving said operator means is carried by said connecting rod means and operatively connected to said operator means for moving said operator means into and out of said mandrel and for maintaining said operator means in said mandrel during coldworking of the hole.

36. A method for coldworking a hole in a workpiece during operation of an automatic fastening machine, said method comprising:

a) providing a coldworking tool including housing means adapted to be carried by said automatic fastening machine and a collapsible mandrel located within said housing means and adapted to alternate between initial and expanded conditions;

b) moving said mandrel between a first position wherein said mandrel is retracted within said housing means, an intermediate position wherein said mandrel is partially extended from said housing but not into the hole in the workpiece, and a second position wherein said mandrel is fully extended from said housing and into the hole in the workpiece;

c) monitoring the amount of movement of said mandrel between said first, intermediate and second positions;

d) maintaining said mandrel in said expanded condition when said mandrel is in the hole in the workpiece to prevent the mandrel from collapsing during coldworking of the hole; and e) wherein said monitoring the amount of movement of said mandrel includes controlling the distance of travel of said mandrel toward the workpiece as determined by the thickness of the workpiece and the cavity depth of tooling contacting the opposite side of the workpiece so as to prevent impact between said mandrel and the tooling cavity.

* * * * *